United States Patent
Gowthaman (10) Patent No.: US 10,193,789 B2
(45) Date of Patent: Jan. 29, 2019

(54) HANDLING PORT IDENTIFIER OVERFLOW IN SPANNING TREE PROTOCOL

(71) Applicant: ARRIS Enterprises LLC, Suwanee, GA (US)

(72) Inventor: Ramesh Gowthaman, Sunnyvale, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 38 days.

(21) Appl. No.: 15/243,782

(22) Filed: Aug. 22, 2016

(65) Prior Publication Data

US 2017/0104665 A1 Apr. 13, 2017

Related U.S. Application Data

(60) Provisional application No. 62/238,604, filed on Oct. 7, 2015.

(51) Int. Cl.
*H04L 12/751* (2013.01)
*H04L 12/46* (2006.01)
*H04L 12/705* (2013.01)

(52) U.S. Cl.
CPC .......... *H04L 45/02* (2013.01); *H04L 12/4625* (2013.01); *H04L 45/18* (2013.01)

(58) Field of Classification Search
None
See application file for complete search history.

(56) References Cited

U.S. PATENT DOCUMENTS

| 6,950,855 | B2 | 9/2005 | Sampathkumar | |
|---|---|---|---|---|
| 6,987,740 | B1 * | 1/2006 | Di Benedetto | H04L 45/02 370/235 |
| 7,558,835 | B1 | 7/2009 | Shafer | |
| 7,675,869 | B1 | 3/2010 | Anker et al. | |
| 9,203,731 | B2 * | 12/2015 | Tallet | H04L 45/00 |
| 9,736,065 | B2 * | 8/2017 | Tsai | H04L 45/46 |
| 2003/0026209 | A1 * | 2/2003 | Katz | H04L 12/42 370/238 |
| 2004/0190454 | A1 * | 9/2004 | Higasiyama | H04L 12/4625 370/238 |

(Continued)

FOREIGN PATENT DOCUMENTS

| EP | 2696538 A1 | 2/2014 |
|---|---|---|
| WO | 2017062671 A1 | 4/2017 |
| WO | 2017070587 A1 | 4/2017 |

OTHER PUBLICATIONS

U.S. Appl. No. 15/595,747, filed May 15, 2017 by Bipin Agarwal.

(Continued)

*Primary Examiner* — Candal Elpenord
(74) *Attorney, Agent, or Firm* — Stewart M. Wiener (57) ABSTRACT

Techniques for handling port identifier overflow when implementing Spanning Tree Protocol (STP) in a networking system are provided. According to one embodiment, a network device can receive a spanning tree protocol (STP) bridge protocol data unit (BPDU) and can extract a port identifier value from the BPDU. The network device can then determine a port number component of the port identifier value by decoding the least significant fourteen bits of the port identifier value and can determine a port priority component of the port identifier value by decoding the most significant two bits of the port identifier value.

21 Claims, 7 Drawing Sheets

(56) References Cited

U.S. PATENT DOCUMENTS

| | | | |
|---|---|---|---|
| 2007/0206513 A1* | 9/2007 | Cho | H04L 12/4625 370/254 |
| 2010/0110880 A1* | 5/2010 | Kulkarni | H04L 12/462 370/221 |
| 2012/0243442 A1* | 9/2012 | Musku | H04L 12/4625 370/256 |
| 2014/0156906 A1 | 6/2014 | Babu et al. | |
| 2014/0181275 A1 | 6/2014 | Lin et al. | |
| 2014/0269710 A1 | 9/2014 | Sundaram et al. | |
| 2015/0341256 A1* | 11/2015 | Jia | H04L 45/22 370/228 |
| 2017/0085488 A1 | 3/2017 | Bhattacharya et al. | |
| 2017/0093628 A1 | 3/2017 | Lin et al. | |
| 2017/0104626 A1 | 4/2017 | Lin et al. | |
| 2017/0104694 A1 | 4/2017 | Lin et al. | |
| 2017/0111296 A1 | 4/2017 | Agarwal et al. | |
| 2017/0118041 A1 | 4/2017 | Bhattacharya et al. | |
| 2017/0118042 A1 | 4/2017 | Bhattacharya et al. | |

OTHER PUBLICATIONS

U.S. Appl. No. 15/489,395, filed Apr. 17, 2017 by Kwun-Nan Kevin Lin. (Unpublished).
Cisco Nexus 5600 Series NX-OS Layer 2 Switching Configuration Guide, Release 7.x; Mar. 15, 2014; Cisco Systems, Inc.; 280 pages.
Configuring the Fabric Extender, Chapter 2; Cisco Nexus 2000 Series Fabric Extender Software Configuration Guide; 16 pages.
Configuring Port Extender Stack; Dell Networking C9010/C1048P; Jan. 30, 2017; https://qrl.dell.com/Files/enus/Html/C9010_C1049P/Configuring%20PE%20Stack.html; 3 pages.
Understanding Junos Fusion Provider Edge Components; Technical Documentation—Support—Juniper Networks; Mar. 31, 2017, 5 pages; https://www.juniper.net/documentation/en_US/junos/topics/concept/fusion-components.html.
U.S. Appl. No. 15/272,218, filed Sep. 21, 2016 by Somen Bhattacharya (Unpublished).
U.S. Appl. No. 15/276,579, filed Sep. 26, 2016 by Kwun-Nan Kevin Lin et al. (Unpublished).
U.S. Appl. No. 15/276,619, filed Sep. 26, 2016 by Kwun-Nan Kevin Lin et al. (Unpublished).
U.S. Appl. No. 15/286,472, filed Oct. 5, 2016 by Bipin Agarwal et al. (Unpublished).
U.S. Appl. No. 15/331,067, filed Oct. 21, 2016 by Somen Bhattacharya et al. (Unpublished).
U.S. Appl. No. 15/331,160, filed Oct. 21, 2016 by Somen Bhattacharya et al. (Unpublished).
Dell C9010 Module Switch Interoperability with Cisco Catalyst 3750, A Development Guide for Dell Networking Switches (v1.0), Dell Network Solutions Engineering, Sep. 2015, 24 pages.
Dell Networking C1048P Getting Started Guide, Sep. 2015, 26 pages.
Juniper Networks, Junos Fusion Provider Edge, Release 14.2R4, Feb. 17, 2016, 646 pages.
Cisco StackWise and StackWise Plus Technology, 2016 Cisco, Mar. 25, 2016, 11 pages.
Dell Stack Master Election, Dell Networking Configuration Guide for the C9000 Series Version 9.9 (0.0), Mar. 25, 2016, 1 page.
Dell Networking Configuration Guide for the C9000 Series, Version 9.9 (0.0), Oct. 2015, 1148 pages.
Chandra Konathala: Bridge port Extension—802.1B; Brocade; Mar. 3, 2014; 38 pages.
Cisco IOS Command Modes; http://www.cisco.com/c/en/us/td/docs/ios/12_2/configfun/configuration/guide/ffun_c/fcf019.html#wp1000922; Mar. 25, 2016; 20 pages.
Dev Datta: EPI—Campus Satellite Solution; Brocade; Aug. 4, 2016; 13 pages.
Vignesh Hariharan: Campus Fabric; Brocade Communications Systems Inc.; 2015; 40 pages.
Selling Campus Fabric FY16, Introducing Campus Fabric; Brocade Communications Systems, Inc.; 2015; 18 pages.
U.S. Appl. No. 15/229,012, filed Aug. 4, 2016 by Lin et al. (Unpublished.).
International Search Report and Written Opinion for International Appln. No. PCT/US2016/055827 dated Jan. 25, 2017, 15 pages.
Virtual Bridged Local Area Networks-Bridge Port Extension, IEEE Computer Society, IEEE STD 802.1 BR-2012, Jul. 16, 2012, 121 pages.
Brocade FastIron Switch Port Extender, Configuration Guide, Supporting FastIron Software Release 8.0.40, Feb. 29, 2016, 88 pages.
International Search Report and Written Opinion for International Appln. No. PCT/US2016/058283 dated Feb. 17, 2017, 12 pages.
Lockwood et al., "Automated Tools to Implement and Test Internet Systems in Reconfigurable Hardware", ACM SIGCOMM Computer Communications Review, vol. 33, No. 3, Jul. 2003, pp. 103-110.

* cited by examiner

INTERFACE 12/1/1

FIG. 7A

INTERFACE 17/1/5

FIG. 7B

OTHER SIDE:

HANDLING PORT IDENTIFIER OVERFLOW IN SPANNING TREE PROTOCOL

CROSS-REFERENCE TO RELATED APPLICATION

The present application claims the benefit and priority of U.S. Provisional Application No. 62/238,604, filed Oct. 7, 2015, entitled "Handling Port Identifier Overflow in Spanning Tree Protocol," the entire contents of which are incorporated herein by reference in its entirety for all purposes.

BACKGROUND

Figure 1:
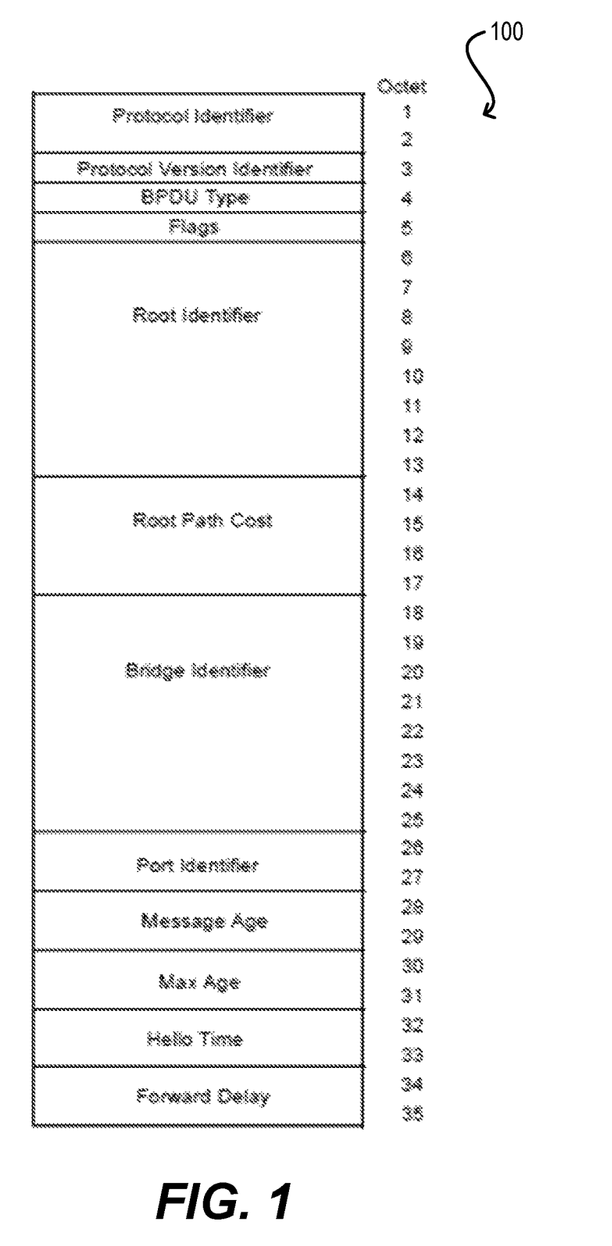
FIG. 1 depicts a format of a configuration bridge protocol data unit (BPDU) according to an embodiment.

The "port identifier" field is one component of the spanning tree priority vectors that are used as the basis of Spanning Tree Protocol's computation of an active topology. According to existing implementations of Spanning Tree Protocol (STP), the port identifier is encoded as two octets (i.e., bytes), which are taken to represent an unsigned binary number. For example, FIG. 1 depicts the format of a conventional configuration bridge protocol data unit (BPDU) 100 that is used by STP according to an embodiment. As shown, BPDU 100 encodes the port identifier at octets 26 and 27.

When two port identifiers are compared by a network device (e.g., bridge) that receives BPDUs such as BPDU 100 of FIG. 1, the lesser number generally denotes the port of higher (i.e., better) priority. The more significant octet of the port identifier is a settable priority component that allows the relative priorities of ports on the same bridge to be managed. The less significant 12 bits correspond to the port number, expressed as an unsigned binary number. Valid port numbers are in the range 1 through 4095. Typically, the value 0 is not used as a port number.

The most significant 4 bits of the port identifier correspond to the priority for the port, which may be set to manage the active topology of the network. The table below specifies default values and ranges for port identifier priorities. If this priority parameter can be updated by management, the bridge can have the capability to use the full range of values with the granularity specified.

TABLE 1

| Recommended or default value | Range |
| --- | --- |
| 128 | 0-240 in steps of 16 |

It should be noted that the number of bits that are considered to be part of the port number (least significant 12 bits) differs in the most current and prior versions of the STP standard. In prior versions, the priority component was 8 bits and the port number component was also 8 bits. This was changed to 4 bits and 12 bits respectively in the most recent version. This change acknowledged that modern switched LAN infrastructures call for increasingly larger numbers of ports to be supported in a single bridge. To maintain management compatibility with older implementations, the priority component in the current STP standard is still considered, for management purposes, to be an 8-bit value, but the values that it can be set to are restricted to those where the least significant 4 bits are zero (i.e., only the most significant 4 bits are settable, hence resulting in steps of 16).

In modern systems of devices (e.g., systems of network devices), the number of devices that are supported has increased drastically due to Institute of Electrical and Electronics Engineers (IEEE) 802.1BR bridge port extension support. For example, some systems of devices can support up to 12 controller bridge (CB) units and 40 port extender (PE) units, with each unit having 128 logical ports. Thus, in these systems of devices, the number of ports that can, or need to, run STP is 6656 (52*128). Further, in the future, the number of units that are supported may climb even higher.

However, as noted above, the current STP standard is only capable of supporting 4095 unique ports (identified by a 12 bit port number component) due to the format of the port identifier field. Accordingly, supporting STP in a modern system of devices with more than 4095 ports is not currently possible.

SUMMARY

Techniques for handling port identifier overflow when implementing Spanning Tree Protocol (STP) in a networking system are provided. According to one embodiment, a network device can receive a spanning tree protocol (STP) bridge protocol data unit (BPDU) and can extract a port identifier value from the BPDU. The network device can then determine a port number component of the port identifier value by decoding the least significant fourteen bits of the port identifier value and can determine a port priority component of the port identifier value by decoding the most significant two bits of the port identifier value.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for handling port identifier overflow when implementing Spanning Tree Protocol (STP) in a networking system (e.g., a system of devices) with more than 4095 ports.

In one set of embodiments, upon processing a 16-bit port identifier value included in an incoming or outgoing BPDU, a network device (e.g., a device in a 802.1BR-based system of devices, such as a CB unit or a PE unit) can decode the least significant 14 bits of the port identifier as corresponding to the port number component, and can decode the most significant 2 bits of the port identifier as corresponding to the port priority. This is in contrast to the current STP standard, which stipulates that the least significant 12 bits of the port identifier correspond to the port number and the most significant 4 bits correspond to the port priority.

With this change, the number of ports that can be supported within a given STP instance/domain can be increased to 16,384 ports. Accordingly, STP can be used on all of the ports in a large scale networking system that has up to 16,384 ports. However, the port priority granularity will be reduced. The table below illustrates new port identifier priority values that can be assigned according to one embodiment:

TABLE 2

| Recommended or default value | Range |
|---|---|
| 128 | 0-192 in steps of 64 (i.e., 0, 64, 128, and 192). |

It should be noted that, to maintain management compatibility with older STP implementations, in certain embodiments the priority component can still be considered an 8-bit value; in these embodiments, the least significant 6 bits can be considered 0.

2. Decoding STP BPDUs

Figure 2:
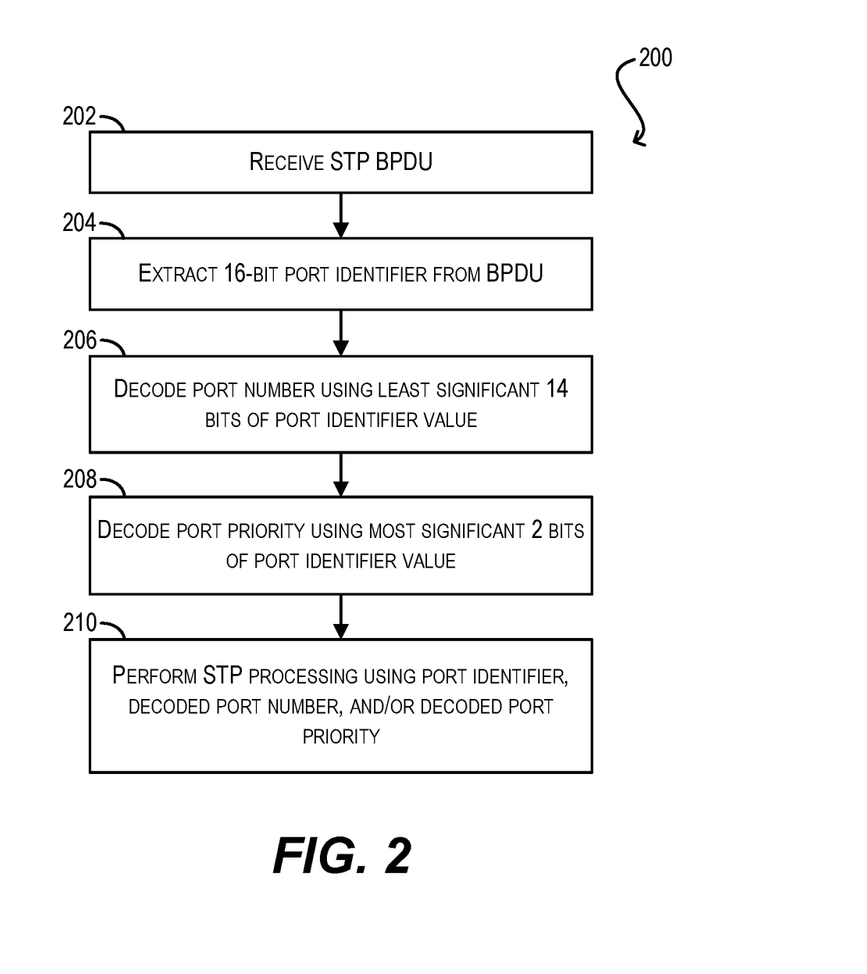
FIG. 2 depicts a flowchart for decoding a port identifier field/parameter in an STP BPDU according to an embodiment.

FIG. 2 depicts a flowchart 200 that can be performed by a network device to decode a port identifier field/parameter in an STP BPDU according to an embodiment. In one embodiment, the network device can be a device in an 802.1BR-based system of devices, such as a CB unit or a PE unit. In other embodiments, the network device can be a device in any other type of networking system or network that makes use of STP.

Starting with block 202, the network device can receive an STP BPDU. At block 204, the network device can extract the 16-bit port identifier value from the BPDU (from, e.g., octets 26 and 27).

Then, at blocks 206 and 208, the network device can decode the 16-bit port identifier value based on a 14-bit/2-bit split for the port number and port priority components respectively. In particular, at block 206, the network device can take the least significant 14 bits of the 16-bit port identifier value and can decode those 14 bits into a port number. Further, at block 208, the network device can take the most significant 2 bits of the 16-bit port identifier value and can decode those 2 bits into a port priority. As mentioned previously, in some embodiments, the network device can internally convert the 2-bit port priority value into an 8-bit value that is padded with zeros for the least significant 6 bits (to maintain compatibility with older STP implementations).

Finally, at block 210, the network device can process the port identifier, port number, and/or port priority values as needed for its STP workflow.

3. Encoding STP BPDUs

Figure 3:
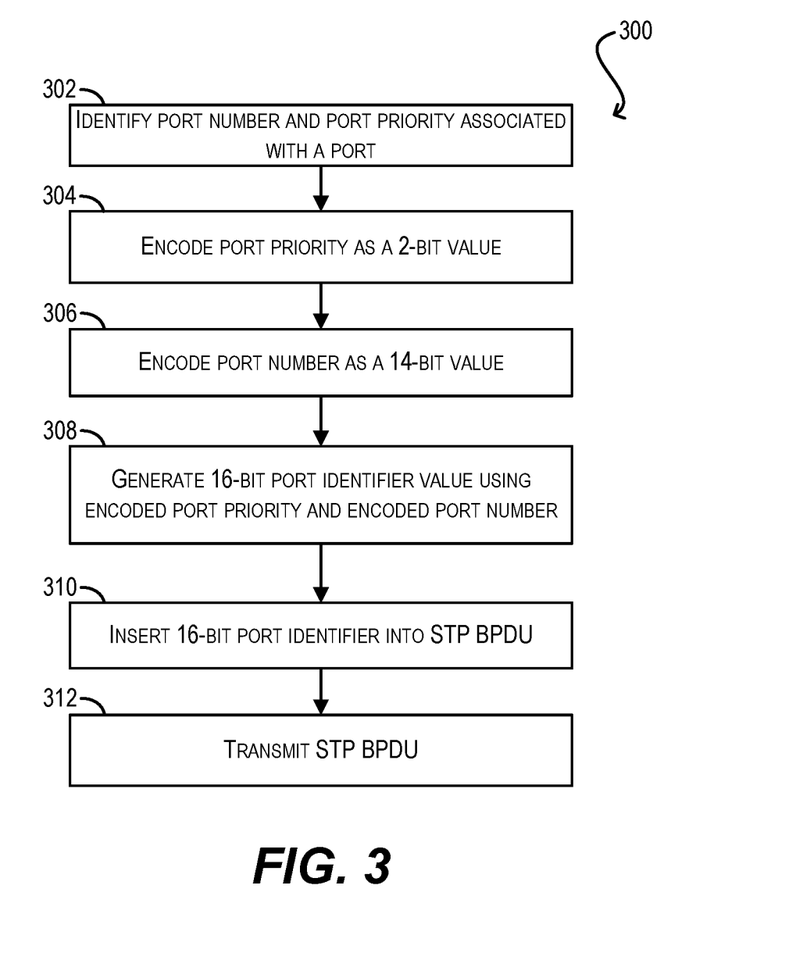
FIG. 3 depicts a flowchart for encoding a port identifier field/parameter for an STP BPDU according to an embodiment.

In addition to decoding STP BPDUs in the manner illustrated in workflow 200, a network device can encode such STP BPDUs in some embodiments. FIG. 3 depicts a flowchart 300 that can be performed by a network device to encode a port identifier field/parameter for an STP BPDU according to an embodiment. In some embodiments, the network device performs flowchart 300 as part of a set of operations to generate an STP BPDU associated with a port on the network device. In one embodiment, the network device can be a device in an 802.1BR-based system of devices, such as a CB unit or a PE unit. In other embodiments, the network device can be a device in any other type of networking system or network that makes use of STP.

Starting with block 302, the network device can identify a port number and a port priority associated with a port of the network device. In some embodiments, the port number and the port priority of ports on the network device are configurable values. At block 304, the network device can encode the port priority value as a 2-bit value. According to the example port priority values shown in Table 2, the network device can encode a port priority value of 0 as 00, a port priority value of 64 as 01, a port priority value of 128 as 10, and a port priority value of 192 as 11. Next, at block 306, the network device can encode the port number as a 14-bit value (e.g., an integer value between 0 and 16,383).

Then, at block 308, the network device can generate a 16-bit port identifier using the encoded port priority and the encoded port number. Specifically, the network device can form the 16-bit port identifier by setting the encoded port number in the least significant 14-bits of the 16-bit port identifier and setting the encoded port priority in the most significant 2-bits of the 16-bit port identifier. At block 310, the network device can insert the 16-bit port identifier in an STP BPDU (e.g., at octets 26 and 27). The network device may also insert values for other fields (e.g., the fields shown in BPDU 100) in the STP BPDU as needed for the STP workflow. Finally, at block 312, the network device can transmit the STP BPDU to other devices in the system of devices as part of its STP workflow.

4. Processing Port Identifiers

Generally speaking, when a network device compares one port identifier to another port identifier to determine relative priorities, the network device compares the port identifier values as a whole (i.e., the entire 16-bit values). Accordingly, even if a particular network device does not implement flowcharts 200 and 300 (in other words, it decodes the port identifier value into a 12-bit port number and a 4-bit port priority per the current STP standard and generates a 16-bit port identifier value by encoding the port number as a 12-bit value and the port priority as a 4-bit value per the current STP standard), that network device can still correctly interoperate with network devices that do implement flowcharts 200 and 300. However, the network device that does not support the decoding technique of flowchart 200 and the encoding technique of flowchart 300 may display different priority and port number values (if a port number beyond 4095 is encoded in the port identifier).

Figure 4:
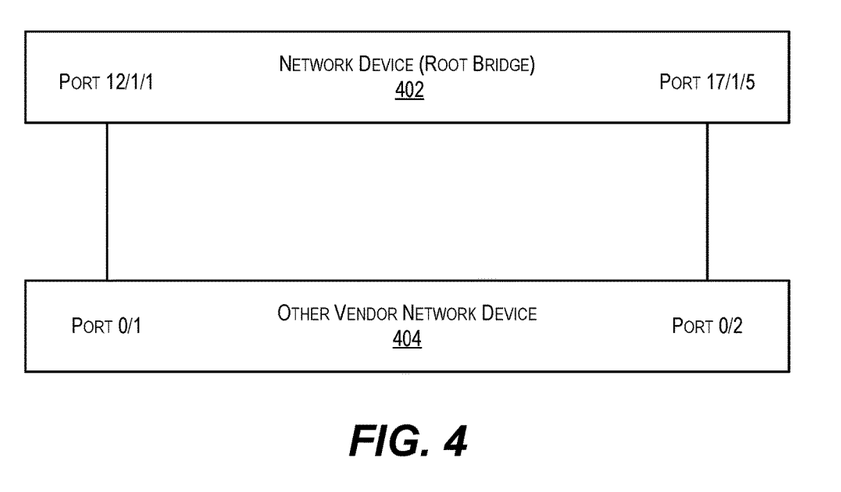
FIG. 4 depicts a system that includes a network device that supports the coding schemes of FIGS. 2 and 3 and a network device that does not support the coding schemes of FIGS. 2 and 3 according to an embodiment.

To illustrate this, FIG. 4 depicts a network device 402 that supports the decoding scheme of FIG. 2 and the encoding scheme of FIG. 3, which is interconnected with another network device 404 that does not support the decoding scheme of FIG. 2 nor the encoding scheme of FIG. 3 (i.e., network device 404 supports the existing STP port identifier decoding and encoding schemes). As shown, port 12/1/1 of network device 402 is connected to port 0/1 of network device 404, and port 17/1/5 of network device 402 is connected to port 0/2 of network device 404. Assume that the software port numbers of 12/1/1 and 17/1/5 are 2816 and 4100 respectively. Further assume that the port priority of 12/1/1 and 17/1/5 is 128.

Figure 7A:
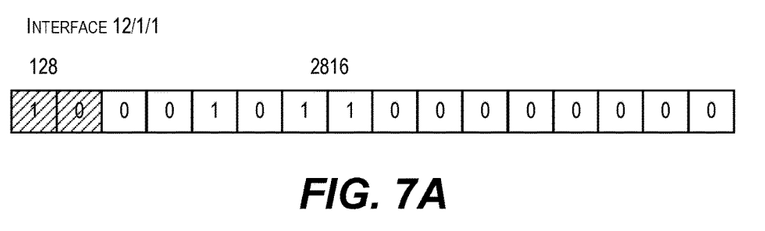
FIGS. 7A, 7B, 7C, and 7D depict how example port identifier values may be decoded in the system of FIG. 4 according to an embodiment.
Figure 7B:
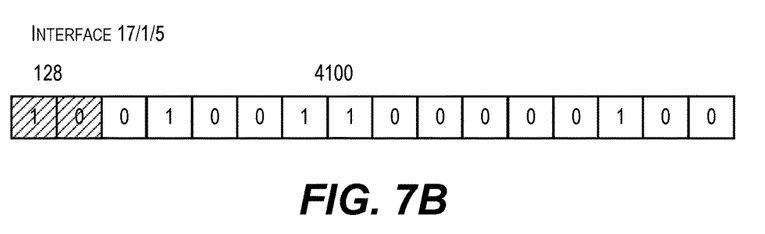
Figure 7C:
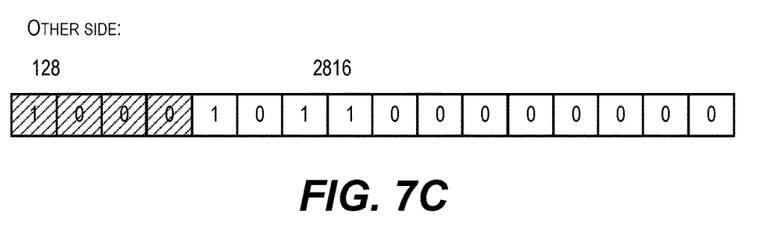
Figure 7D:
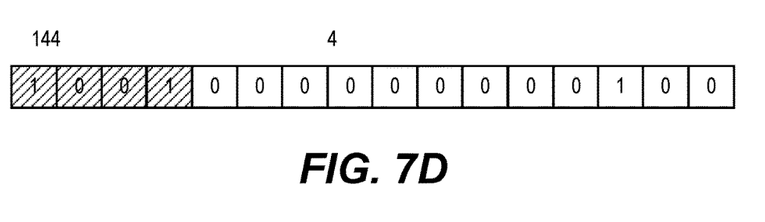

In this scenario, the FIGS. 7A and 7B show how the port identifier values corresponding to 12/1/1 and 17/1/5 will be decoded on the side of network device 402 (note that port priority bits are shaded), FIGS. 7C and 7D show how the port identifier values corresponding to 12/1/1 and 17/1/5 will be decoded on the side of network device 404 (note that port priority bits are shaded), As can be seen, the two devices display the same port priorities and port numbers for 12/1/1, since the port number is less than 4095 (2816). However, device 404 displays a different port priority and port number for 17/1/5 due to the differences in decoding. As mentioned previously, this generally should not pose a functional problem since the port identifier values are usually compared as whole 16-bit values.

5. Example Network Device

Figure 5:
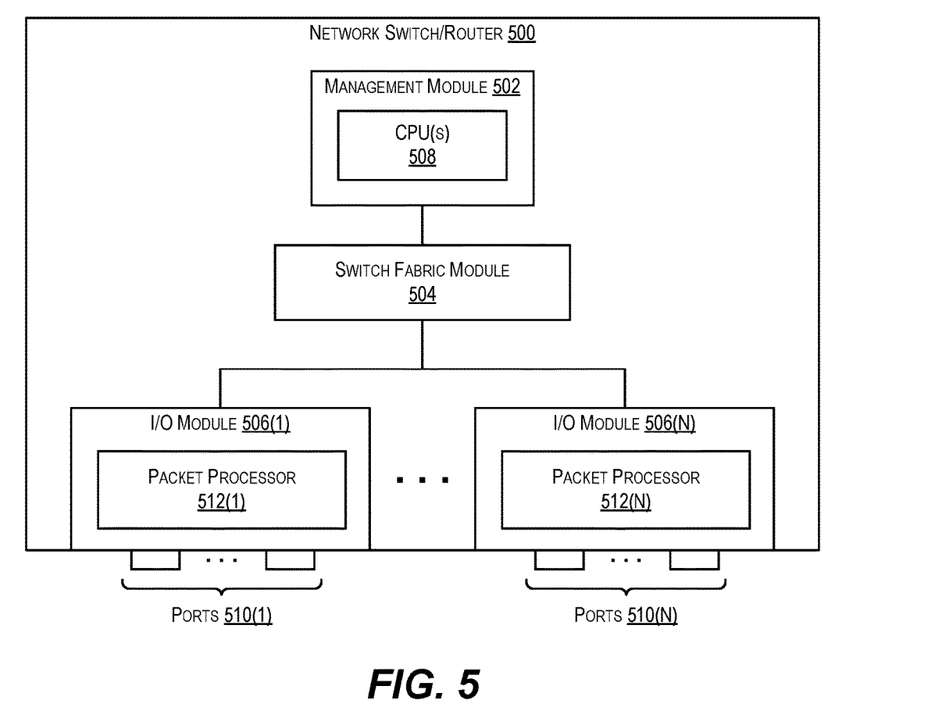
FIG. 5 depicts an example network device according to an embodiment.

FIG. 5 depicts an example network device (e.g., switch/router) 500 that may implement the decoding techniques and encoding techniques described herein according to an embodiment.

As shown, network switch/router 500 includes a management module 502, a switch fabric module 504, and a number of I/O modules 506(1)-506(N). Management module 502 includes one or more management CPUs 508 for managing/controlling the operation of the device. Each management CPU 508 can be a general purpose processor, such as a PowerPC, Intel, AMD, or ARM-based processor, that operates under the control of software stored in an associated memory (not shown).

Switch fabric module 504 and I/O modules 506(1)-506(N) collectively represent the data, or forwarding, plane of network switch/router 500. Switch fabric module 504 is configured to interconnect the various other modules of network switch/router 500. Each I/O module 506(1)-506(N) can include one or more input/output ports 510(1)-510(N) that are used by network switch/router 500 to send and receive data packets. Each I/O module 506(1)-506(N) can also include a packet processor 512(1)-512(N). Packet processor 512(1)-512(N) is a hardware processing component (e.g., an FPGA or ASIC) that can make wire speed decisions on how to handle incoming or outgoing data packets.

It should be appreciated that network switch/router 500 is illustrative and not intended to limit embodiments of the present disclosure. Many other configurations having more or fewer components than switch/router 500 are possible.

6. Example Computer System

Figure 6:
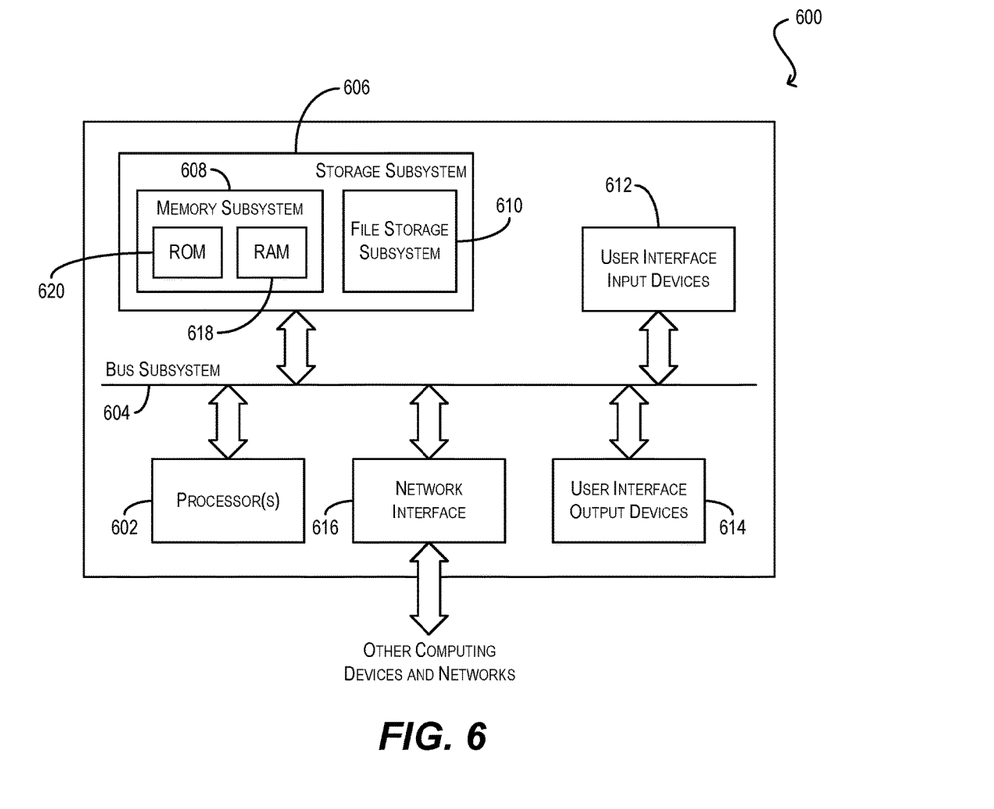
FIG. 6 depicts an example computer system according to an embodiment.

FIG. 6 depicts an example computer system 600 according to an embodiment. Computer system 600 can be used to implement a virtual version of the network device configured to carry out flowchart 200 of FIG. 2 and flowchart 300 of FIG. 3. As shown in FIG. 6, computer system 600 can include one or more processors 602 that communicate with a number of peripheral devices via a bus subsystem 604. These peripheral devices can include a storage subsystem 606 (comprising a memory subsystem 608 and a file storage subsystem 610), user interface input devices 612, user interface output devices 614, and a network interface subsystem 616.

Bus subsystem 604 can provide a mechanism for letting the various components and subsystems of computer system 600 communicate with each other as intended. Although bus subsystem 604 is shown schematically as a single bus, alternative embodiments of the bus subsystem can utilize multiple busses.

Network interface subsystem 616 can serve as an interface for communicating data between computer system 600 and other computing devices or networks. Embodiments of network interface subsystem 616 can include wired (e.g., coaxial, twisted pair, or fiber optic Ethernet) and/or wireless (e.g., Wi-Fi, cellular, Bluetooth, etc.) interfaces.

User interface input devices 612 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 600.

User interface output devices 614 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 600.

Storage subsystem 606 can include a memory subsystem 608 and a file/disk storage subsystem 610. Subsystems 608 and 610 represent non-transitory computer-readable storage media that can store program code and/or data that provide the functionality of various embodiments described herein.

Memory subsystem 608 can include a number of memories including a main random access memory (RAM) 618 for storage of instructions and data during program execution and a read-only memory (ROM) 620 in which fixed instructions are stored. File storage subsystem 610 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 600 is illustrative and not intended to limit embodiments of the present invention. Many other configurations having more or fewer components than computer system 600 are possible.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
receiving, by a network device, a spanning tree protocol (STP) bridge protocol data unit (BPDU);
extracting, by the network device, a port identifier value from the BPDU;
determining, by the network device, a fourteen-bit port number associated with the BPDU by decoding the least significant fourteen bits of the port identifier value; and
determining, by the network device, an eight-bit port priority associated with the BPDU by:
decoding the most significant two bits of the port identifier value; and
converting the most significant two bits of the port identifier value into the eight-bit port priority, the converting comprising padding the least significant six bits of the eight-bit port priority with zeroes.

2. The method of claim 1, wherein extracting the port identifier value comprises extracting a sixteen-bit value from octets 26 and 27 of the BPDU.

3. The method of claim 1, wherein the network device is part of a system of network devices that includes more than 4095 ports on which STP is run.

4. The method of claim 1, wherein the network device is a device in an 802.1BR-based system of devices.

5. The method of claim 1, wherein a value of the eight-bit port priority is configurable within a range of zero to 192.

6. The method of claim 5, wherein the value of the eight-bit port priority is configurable using steps of 64 within the range of zero to 192.

7. The method of claim 5, wherein the value of the fourteen-bit port number is configurable within a range of zero to 16,383.

8. A non-transitory computer readable storage medium having stored thereon program code executable by a device, the program code causing the device to:
receive a spanning tree protocol (STP) bridge protocol data unit (BPDU);
extract a port identifier value from the BPDU;
determine a fourteen-bit port number associated with the BPDU by decoding the least significant fourteen bits of the port identifier value; and
determine an eight-bit port priority associated with the BPDU by;
decoding the most significant two bits of the port identifier value; and
converting the most significant two bits of the port identifier value into the eight-bit port priority, the converting comprising padding the least significant six bits of the eight-bit port priority with zeroes.

9. The non-transitory computer readable storage medium of claim 8, wherein extracting the port identifier value comprises extracting a sixteen-bit value from octets 26 and 27 of the BPDU.

10. The non-transitory computer readable storage medium of claim 8, wherein the device is part of a system of devices that includes more than 4095 ports on which STP is run.

11. The non-transitory computer readable storage medium of claim 8, wherein the device is a network device in an 802.1BR-based system of network devices.

12. The non-transitory computer readable storage medium of claim 8, wherein a value of the eight-bit port priority is configurable within a range of zero to 192.

13. The non-transitory computer readable storage medium of claim 12, wherein the value of the eight-bit port priority is configurable using steps of 64 within the range of zero to 192.

14. The non-transitory computer readable storage medium of claim 8, wherein the value of the fourteen-bit port number is configurable within a range of zero to 16,383.

15. A network device comprising:
a processor; and
a non-transitory computer readable medium having stored thereon program code that, when executed by the processor, causes the processor to:
receive a spanning tree protocol (STP) bridge protocol data unit (BPDU);
extract a port identifier value from the BPDU;
determine a fourteen-bit port number associated with the BPDU by decoding the least significant fourteen bits of the port identifier value; and
determine an eight-bit port priority associated with the BPDU by:
decoding the most significant two bits of the port identifier value; and
converting the most significant two bits of the port identifier value into the eight-bit port priority, the converting comprising padding the least significant six bits of the eight-bit port priority with zeroes.

16. The network device of claim 15, wherein extracting the port identifier value comprises extracting a sixteen-bit value from octets 26 and 27 of the BPDU.

17. The network device of claim 15, wherein the network device is part of a system of network devices that includes more than 4095 ports on which STP is run.

18. The network device of claim 15, wherein the network device is a device in an 802.1BR-based system of devices.

19. The network device of claim 15, wherein a value of the eight-bit port priority is configurable within a range of zero to 192.

20. The network device of claim 19, wherein the value of the eight-bit port priority is configurable using steps of 64 within the range of zero to 192.

21. The network device of claim 15, wherein the value of the fourteen-bit port number is configurable within a range of zero to 16,383.

* * * * *